Jan. 26, 1971 J. M. MILLS 3,559,009
D.C. MOTOR CONTROL SYSTEM WHICH COMPARES THE MOTOR CURRENT
WITH A REFERENCE TO CONTROL THE MOTOR SPEED
Filed March 6, 1968 2 Sheets-Sheet 1

WITNESSES
Theodore F. Wrobel
James F. Young

INVENTOR
John M. Mills
BY
ATTORNEY

United States Patent Office 3,559,009
Patented Jan. 26, 1971

3,559,009
D.C. MOTOR CONTROL SYSTEM WHICH COMPARES THE MOTOR CURRENT WITH A REFERENCE TO CONTROL THE MOTOR SPEED
John M. Mills, Pittsburgh, Pa., assignor to Westinghouse Electric Corporation, Pittsburgh, Pa., a corporation of Pennsylvania
Filed Mar. 6, 1968, Ser. No. 711,109
Int. Cl. H02p 7/68
U.S. Cl. 318—95                                8 Claims

ABSTRACT OF THE DISCLOSURE

A control system for traction motors for rapid transit cars. The system includes a direct current chopper utilizing thyristors for connecting the motors to the power source and means for turning the chopper on and off as required to maintain a desired average motor current. Pulse generators provide gate pulses for the thyristors to turn the chopper on and off and the pulse generators are actuated by a control circuit which compares the motor current with a signal representing the desired motor current. The control circuit also includes means for maintaining a predetermined ripple in the motor current.

---

The present invention relates to a control system for direct current traction motors such as are used for propulsion of rapid transit cars, and more particularly to a static control system adapted for use with automatic train control systems.

Direct current series motors are commonly used for propulsion of rapid transit cars and controlled to obtain the desired speed and acceleration rate by varying the voltage. In the conventional control systems usually used heretofore, this is done by means of a resistor in series with the motors which is progressively cut out in steps to increase the voltage applied to the motors. The motors usually are initially connected in series and after the resistance has been cut out, they are reconnected in parallel with the resistance again in the circuit and the resistance is again cut out in steps to bring the motors up to full voltage. For dynamic braking, the motors are connected in a braking circuit including a resistor and the resistor is cut out in steps to maintain the desired braking current. These conventional control systems require many mechanical switches or contactors for cutting out the resistance in steps, and involve complicated control circuits with many relays for controlling the contactors to cut out the steps of resistance in the desired sequence and to limit the rates of acceleration and braking to the desired values. These conventional systems therefore require considerable maintenance to insure proper operation and involve relatively fixed rates of acceleration and braking which can not easily be adjusted or changed, as well as having the disadvantage of excessive losses in the resistance during acceleration.

The present invention has as its principal object to provide a relatively simple control system for direct current traction motors utilizing solid state devices to control the motor current, both in acceleration and in braking, in accordance with a control signal which may be obtained from an automatic train control system. In general, the system utilizes a semiconductor switching device or chopper which can be repetitively turned on or off very rapidly to control the motor current, and which is controlled directly in response to the current to turn the chopper on or off as necessary to maintain a desired average current.

Motor control systems using chopper have been proposed heretofore in which the current pulse width was varied to control the current, or in which the frequency of the pulses was varied, or some combination of these two methods was employed. These systems, however, have many disadvantages when applied to direct current traction motors. For example, these systems have a relatively large ripple in the motor current, and it is difficult to control for the full range of voltage, while they do not readily allow for variations or changes in the impedance of the source. In accordance with the present invention, the chopper is controlled solely in response to the motor current, so that both the pulse width and frequency are allowed to vary and the chopper is turned on or off as required to maintain the desired average motor current, with a predetermined ripple which can be made as small as desired. In this way a simple control system is provided which is controlled by an input control signal to maintain any desired value of current, and which operates satisfactorily over the entire range of voltage as well as automatically compensating for variation in the line voltage or impedance since the control will maintain constant motor current regardless of line voltage variations. Furthermore, the control will protect the motors in the event of a flashover since it will turn off the chopper immediately without having to wait until the end of a fixed pulse of current, thus preventing excessive current surges in the equipment.

Briefly, the new control system utilizes a solid state direct current chopper which, for power operation is connected in series between the motors and the power source and turned on and off as required to maintain the desired motor current. For dynamic braking, the motors are connected in a braking circuit which includes a braking resistor and the chopper is connected across at least a part of the resistor and turned on and off as required to maintain the desired braking current by cutting the resistor in and out of the circuit. The chopper is controlled by means of a control voltage derived from a current signal which represents the desired motor current. The control voltage is compared with a voltage representing the actual motor current to obtain signals which trigger on and off pulse generators to provide gating pulses to the chopper to turn it on or off as required. This provides a relatively simple, completely static control system which requires no resistors for acceleration and no change of motor connections from series to parallel. The acceleration and braking rates are infinitely variable and can readily be changed or adjusted at any time by changing the control signal. Since the control is entirely static using solid state devices of high reliability, little maintenance is required and long life is obtained.

The invention will be more fully understood from the following detailed description of an illustrative embodiment, taken in connection with the accompanying drawings, in which.

Figure 1:
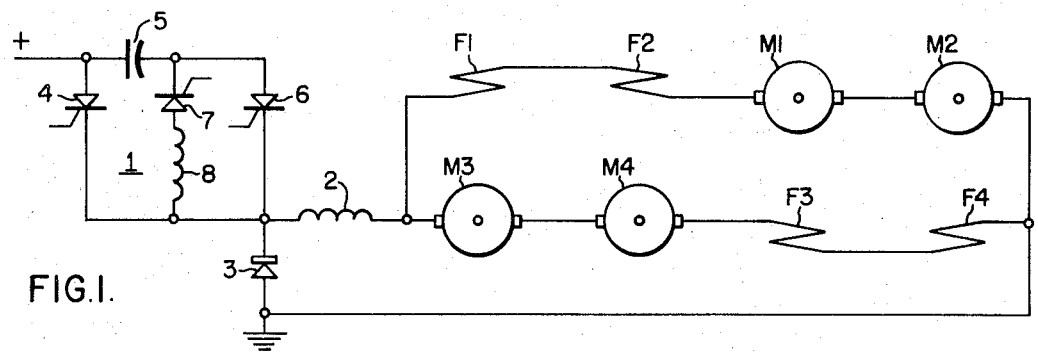
FIG. 1 is a simplified diagram showing the basic power connection of the traction motors.

FIG. 1 shows a simplified basic circuit for the power connection of the motors. As shown, there are two series-connected motors M1 and M2 having field windings F1 and F2, respectively, connected in series with the motors. A second series-connected pair of motors M3 and M4 are connected in series with their field windings F3 and F4, respectively, and the two pairs of series-connected motors are connected in parallel. Two pairs of motors in parallel are shown in accordance with usual practice for the propulsion motors of rapid transit cars, but it will be understood that the system is applicable to a single motor or to any number of motors connected in any desired manner. It is to be noted, however, that there is no change from series to parallel connection during operation as in conventional controls. A semiconductor switching device, shown as a direct current chopper 1, is connected in series with the motors between the power source and the motors, and a reactor 2 to smooth the motor current is connected in series between the chopper and the motors. The other end of the circuit is connected to ground in the usual manner. A free wheeling diode 3 is connected across the motors and reactor as shown.

The chopper 1 may be of any suitable type but a preferred type of chopper is shown. The chopper 1 includes a thyristor 4 adapted to carry the total motor current, with a commutating capacitor 5 and a turn-off thyristor 6 connected across the thyristor 4 in the manner shown. An oppositely poled thyristor 7 and a reactor 8 are connected in a loop circuit with the capacitor 5 as shown in the drawing. In operation, the chopper is started by initially firing the thyristor 6 to turn it on. This permits a charging current to flow to charge the capacitor 5 from the line, and when the capacitor 5 is charged the current goes to zero and the thyristor 6 turns off. The chopper is then ready for operation and is turned on by simultaneously firing the thyristors 4 and 7. This permits current flow through the thyristor 4 to the motors and at the same time completes an oscillatory circuit through the reactor 8 and thyristor 7 to the capacitor 5. Current from the capacitor 5 flows through the thyristor 4 to the reactor 8 and back to the capacitor, in effect transferring the charge on the capacitor to the reactor and back to the capacitor, thus recharging the capacitor with its voltage reversed. The current then ceases to flow and the thyristor 7 turns off. It will be understood that this entire operation of turning the thyristor on and reversing the charge on the capacitor takes place very rapidly, in a few microseconds, and the chopper is now in its on or conductive condition with the full motor current flowing through the thyristor 4 and through the motors to ground. To turn the chopper off the thyristor 6 is fired. This completes a circuit from the commutating capacitor 5 to the thyristor 4 and applies the reverse voltage of the capacitor to the thyristor 4 to turn it off. The capacitor 5 then charges from the line as previously described, the charging current flowing through thyristor 6 until the capacitor is charged when the current goes to zero and the thyristor 6 turns off. The chopper 1 is then in its off or non-conductive condition and is ready to be again turned on as described above.

In the operation of the system, the chopper 1 is initially turned on to apply the full line voltage to the motors so that the motor current builds up and the motors start and accelerate the car. When the motor current has increased to a desired value, the chopper is turned off by the control circuitry described hereinafter, interrupting the power supply to the motors. Since the motor circuit is highly inductive, however, the motor current cannot drop to zero instantaneously but decays at a relatively slow rate. The free wheeling diode 3 is provided to permit this action. When the chopper is on, the diode 3 is in the blocking direction with respect to the line voltage so that no current flows through it. When the chopper is turned off, however, the diode 3 provides a path for the motor current, forming a loop circuit through the motors, the diode 3 and reactor 2 so that the motor current decays at a rate determined by the back EMF of the motors and the inductance of the circuit. When the current has thus decayed to a predetermined level, the chopper 1 is again turned on by the control circuitry and the motor current starts to increase until it reaches the predetermined level at which the chopper is turned off. This action is continued and since the chopper is a solid state device which can be turned on and off very rapidly for an unlimited number of times without damage, a high repetition rate is possible. By turning the chopper on and off in accordance with the motor current, the average current can be maintained accurately at a desired level corresponding to a desired speed or rate of acceleration and with a desired ripple or spread between the values of motor current at which the chopper is turned on and off.

Figure 2:
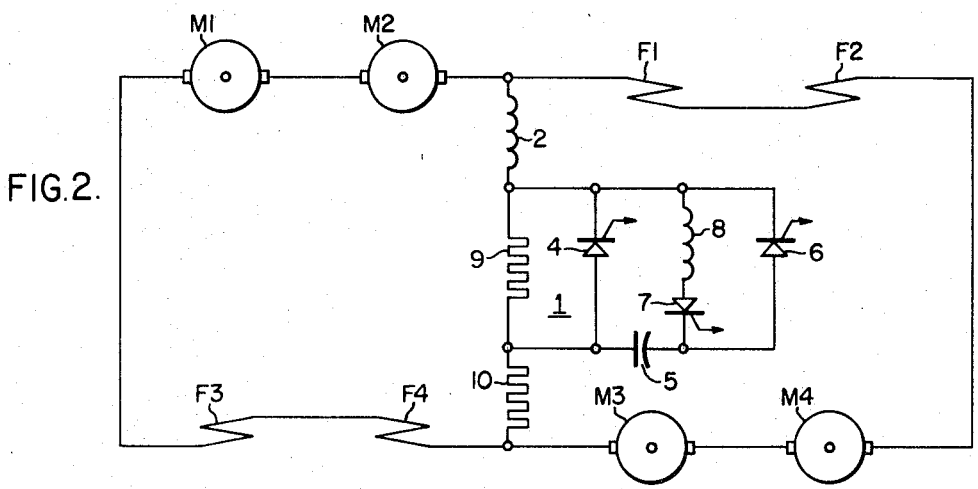
FIG. 2 is a similar diagram showing the braking connection.

For dynamic braking, the motors are connected in a braking circuit shown in simplified form in FIG. 2. This is a more or less conventional braking circuit consisting of two loop circuits each containing the armatures of two of the motors and the field windings of the other two motors with a common branch containing a braking resistor. In braking, the motors are driven as generators by the car and current circulates in each of the loop circuits and through the braking resistor, the braking effort being determined by the motor current and the braking energy being dissipated in the resistor. In accordance with the present invention, the braking resistor consists of a relatively large resistor 9 and a relatively smaller resistor 10 which remains in the circuit at all times. The chopper 1 is connected across the resistor 9 so that when the chopper is turned on, the resistor 9 is short circuited and taken out of the circuit, while when the chopper is turned off the resistor 9 is reinserted in the circuit. For braking, the chopper is controlled in essentially the same manner as for power. When the motor current flowing through the common branch of the two loop circuits exceeds the desired value, the chopper is turned off to insert the resistor 9 in the circuit. This causes the current to decrease because of the increased resistance and when it has decreased to the predetermined lower limit, the chopper is turned on to remove the resistor 9 from the circuit so that the current again increases. This action is repeated by turning the chopper on and off as needed to maintain the motor current at the desired average value.

Figure 3:
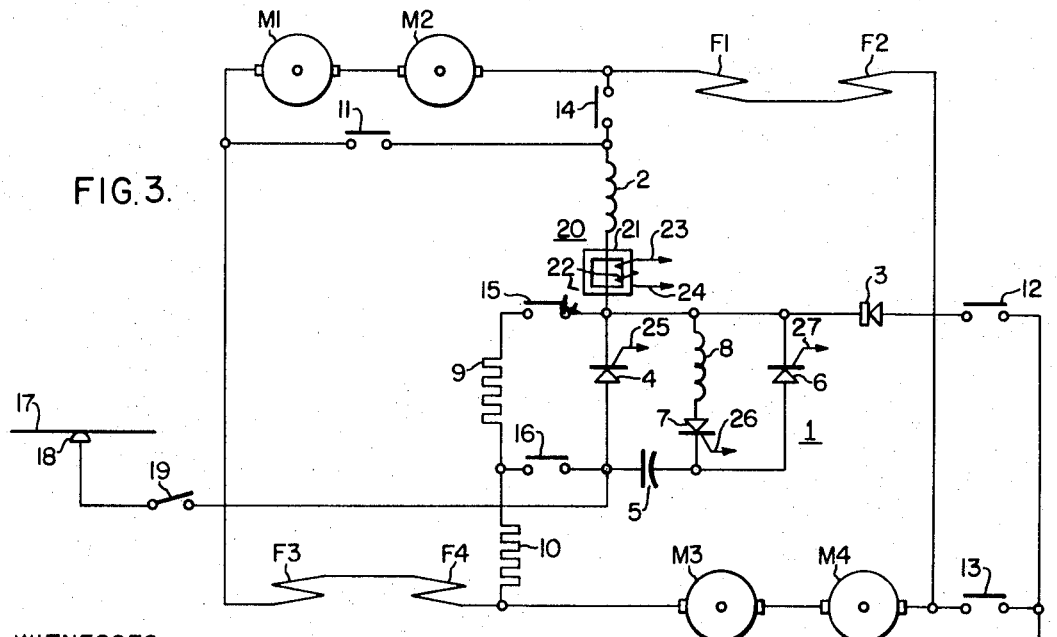
FIG. 3 is a schematic diagram showing a typical motor circuit.

FIG. 3 shows a simplified circuit arrangement for the motors M1, M2, M3 and M4 in an actual embodiment of the invention in a rapid transit propulsion control system. It will be seen that this circuit is essentially similar to the basic circuit of FIG. 2 with the addition of a set of power contacts 11, 12 and 13 and a set of braking contacts 14, 15 and 16. Power is supplied from a third rail or trolley 17 through a current collector 18 which is connected through a line switch 19 to the chopper 1 as shown. It will be seen that when the power contacts 11, 12 and 13 and the line switch 19 are closed the power circuit of FIG. 1 results. When the brake contacts 14, 15 and 16 are closed, with the line switch 19 open, the braking circuit of FIG. 2 is obtained. Any suitable or desired type of control circuit may be utilized for controlling the contacts and providing the necessary interlocking and safety features.

It will be understood that the circuit of FIG. 3 is very much simplified and certain more or less conventional features have been omitted. Thus, for example, the field windings F1, F2, F3 and F4 would normally be connected through reversing switches to permit operation of the car in either forward or reverse directions. Means would also normally be provided for shunting the field windings in power and preferably also in braking, and various overload and protective features would also be provided. Since these features are not a part of the present invention, however, they have been omitted to avoid unnecessary complication.

The total motor current in either power or brake is measured by a transductor 20 connected as shown between the chopper 1 and the reactor 2 so as to carry the motor current in either connection. The transductor may be of any suitable type including a saturable core 21 disposed to be linked by the flux produced by the motor current and having an alternating current winding 22. The current in the winding 22 is then proportional to the motor current and the output leads 23 and 24 of the transductor are connected to the control circuit to provide a signal representing the actual motor current.

The chopper 1 is turned on and off in the manner previously described. That is, the chopper is turned on by simultaneously providing gating pulses to the gate electrodes of the thyristors 4 and 7 through leads 25 and 26, respectively, and the chopper is turned off by providing a gate pulse to the gate electrode of thyristor 6 through a lead 27. The pulses for turning the thyristors on and off are provided in response to motor current by the control circuitry which will now be described.

Figure 4:
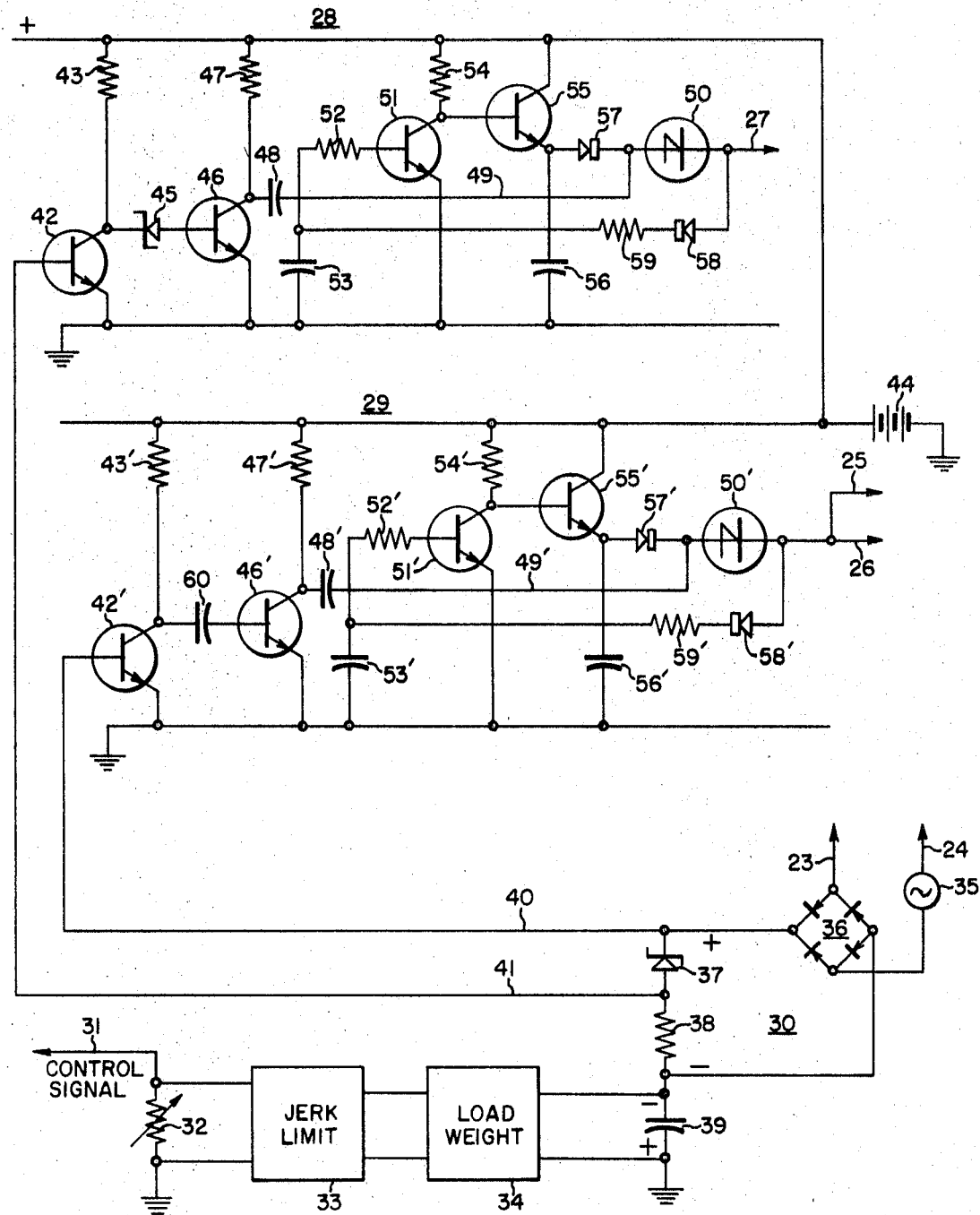
FIG. 4 is a circuit diagram showing the control circuits for the chopper.

The chopper 1 is turned on and off as required by means of the control circuit shown in FIG. 4. The chopper is controlled by gate pulses derived from an Off pulse generator 28 and an On pulse generator 29. Triggering signals for actuating the pulse generators to provide gate pulses to the chopper are provided from a control circuit 30 which, in effect, compares the actual motor current with a signal representing the desired motor current and signals the pulse generators to turn the chopper on or off as required.

The system is controlled by a control signal applied through the conductor 31. The control signal is preferably in the form of a signal current which may be obtained from an automatic train control system of any suitable type, as by receiving signals from a wayside controller, or it may be obtained from any other desired type of controller such as a controller on the car either manually or automatically operated. The control signal is in the form of a current the magnitude of which represents the desired motor current or the desired braking effort, to obtain the desired rate of acceleration or deceleration. The speed and the rate of acceleration or deceleration of the car, therefore, is controlled by adjusting the magnitude of the control signal current on conductor 31.

A control voltage is derived from the signal 31 and is shown diagrammatically as the voltage across the resistor 32, which is indicated as being variable to represent the varying control voltage. It will be understood that the control signal may change abruptly to change the rate of acceleration, or to change from acceleration to braking, and since the type of control system disclosed herein is capable of following changes in the control signal almost instantaneously, the rate of change of the control voltage must be limited to an acceptable value for the safety and comfort of passengers. For this reason the control voltage 32 is modified by a jerk limit circuit 33. This circuit may be of any suitable type which is capable of limiting the rate of change of the control voltage 32 to an acceptable maximum and of providing an output voltage representing the control signal as so modified. Any suitable circuit of this type may be used but a preferred circuit is shown in a copending application of L. G. Miller, Serial No. 711,103, filed Mar. 6, 1968, now Patent No. 3,543,121 and assigned to the assignee of the present application.

It will also be appreciated that the necessary tractive effort or braking effort for a desired rate of acceleration or deceleration varies with the weight of the car, and it is therefore necessary to further modify the control voltage so that the motor current actually maintained will be that required to produce the desired rate of acceleration or deceleration with the particular load or weight of the car at a particular time. The voltage signal obtained from the jerk limit circuit 33 is therefore further modified by a load weight circuit 34 which measures the weight of the car and modifies the signal accordingly. Such circuits are known in the art but a circuit particularly suitable for this type of control system is disclosed in another copending application of L. G. Miller, Ser. No. 711,002, filed Mar. 6, 1968, now Patent No. 3,543,113 and assigned to the assignee of the present application. The output voltage of the load weight circuit 34, therefore, is a suitably modified control voltage derived from the control signal and representing the motor current necessary to obtain the acceleration rate or deceleration rate called for by the control signal.

This control voltage is applied to the control circuit 30 to be compared with the actual motor current. A signal voltage proportional to the motor current is obtained from the transductor 20 as previously explained. The lead 23 and 24 of the transductor winding are connected to a suitable source of alternating current 35, which may be derived from the car battery through an inverter or which may be any suitable source, and the output current of the transductor is rectified by a rectifier bridge 36. The direct current output of the rectifier 36, therefore, provides a voltage which is proportional to the motor current and which is applied to the control circuit 30.

The control circuit 30 includes three impedance means connected in series. In the illustrative embodiment these consist of a Zener diode 37, a resistor 38 and a capacitor 39. The current signal voltage obtained from the rectifier 36 is applied across the Zener diode 37 and resistor 38 in series, as shown, and the control voltage derived from the control signal is applied across the capacitor 39. The signal voltage and the control voltage are applied with their polarities opposing as indicated on the drawing. If the actual motor current is exactly equal to the desired current so that the control voltage is equal to the signal voltage of the rectifier 36, the net resultant voltage across the three impedance elements in series will be zero. If the motor current changes so that it is greater or less than the desired value, a net resultant voltage will appear across the diode 37 and resistor 38. This resultant voltage is used to provide triggering signals to the pulse generators 28 and 29. For this purpose a conductor 40 is connected to the upper end of the diode 37 to provide a triggering signal to the On pulse generator 29, and a conductor 41 is connected to the junction between the diode 37 and resistor 38 to provide a triggering signal to the Off pulse generator 28.

It will be seen that if the signal voltage across the diode 37 and resistor 38 is greater than the control voltage across capacitor 39, a positive resultant voltage will appear on the conductor 40. If the motor current decreases so that the voltage across diode 37 and resistor 38 becomes less than the control voltage across capacitor 39, the voltage on conductor 40 will go negative and this triggers the On pulse generator 29 to turn on the chopper 1 so that the motor current can increase. When the motor current has increased by an amount corresponding to the voltage across the diode 37, the voltage on the conductor 41 will become positive and this triggers the Off pulse generator 28 to turn the chopper off. In this way the chopper is turned on and off as required to maintain the desired average motor current.

The voltage drop across the diode 37 represents the difference between the values of motor current at which the chopper is turned on and turned off, and thus determines the ripple in the motor current or the difference between maximum and minimum values of the current. The Zener diode shown has a substantially constant voltage drop so that a constant ripple is provided in this way. It will be understood of course that other impedance elements might be used in place of the Zener diode 37. Thus for example other semiconductor devices, such as a series of diodes, having substantially constant forward voltage drop might be used, or if desired a resistor of proper size might be used. If semiconductor devices are used the ripple is of substantially constant magnitude determined by the voltage drop across the semiconductor devices. If a resistor is used the voltage drop across it will of course vary with the current, and the ripple will be a constant percentage of the current rather than a constant amount. It will be seen that the amount of ripple can be made as small as desired by proper choice of the impedance element 37.

The pulse generators 28 and 29 are essentially similar in operation, and each operates to provide an output pulse when triggered by the control circuit 30. Any suitable type of pulse generator meeting the requirements could be used but the particular generators shown are preferred because of their desirable characteristics. A pulse generator to be used for controlling a direct current chopper for controlling motors must meet rather exacting requirements. A pulse generator for this type of service must have high input impedance and rapid response and must be capable of a high repetition rate. In addition the output pulses must have a fast rise time and must provide a sufficient magnitude of current to positively and reliably gate the thyristors. The pulse generator circuits shown meet all these requirements in a very satisfactory manner.

Referring first to the Off pulse generator 28, the generator includes a transistor 42 which has its base connected to the conductor 41 to receive the off triggering signal. The collector of the transistor 42 is connected through a current limiting resistor 43 to a suitable source of direct current, such as the car battery 44, and its emitter is connected to ground as shown. The collector of transistor 42 is coupled, preferably through a Zener diode 45, to the base of a transistor 46 and the collector of this transistor is also connected to the direct current source through a resistor 47. The collector of transistor 46 is also connected to a capacitor 48 which is connected through a conductor 49 to a breakdown diode 50. A transistor 51 has its base connected to ground through a resistor 52 and capacitor 53 and its collector is connected to the direct current source through a resistor 54. The collector of transistor 51 is also connected to the base of a transistor 55 which has its collector connected to the direct current source 44 and its emitter connected to a capacitor 56 which is connected to ground so as to be charged from the direct current source through the transistor 55. The emitter of transistor 55 is also connected to the breakdown diode 50 and to the conductor 49 through a blocking diode 57. The breakdown diode 50 is connected to the output lead 27, and through a diode 58 and resistor 59 to the RC circuit consisting of resistor 52 and capacitor 53.

In the operation of the pulse generator 28 the capacitors 48 and 56 are initially charged. If the transistor 42 is non-conductive, the transistor 46 has base drive and is conductive so that capacitor 48 is grounded through transistor 46. If a positive signal is now applied to the base of transistor 42, it is turned on and transistor 46 is turned off. The voltage of capacitor 48 is then applied to the breakdown diode 50 additively with the voltage of the direct current source through conductor 49, and since this results in applying substantially twice the voltage of the direct current supply to the diode 50, the diode 50 becomes conducting and an output pulse appears on conductor 27. This pulse is also applied through the diode 58 to the RC circuit 52, 53 and results in turning on transistor 51 for a short time determined by the constants of the RC circuit. This turns off transistor 55 and permits capacitor 56 to discharge through diode 57 and breakdown diode 50. The capacitor 56 may be relatively larger than capacitor 48 and provides the desired current and duration for the output pulse of the pulse generator. Turning off the transistor 55 during the duration of the pulse permits capacitor 56 to fully discharge and when transistor 51 is again turned off after the short time interval mentioned above, transistor 55 turns on and capacitor 56 charges through transistor 55. Capacitor 48 is also again charged through diode 57 and conductor 49 in readiness for another operation when another positive signal is applied to transistor 42. Thus the pulse generator 28 meets the requirements outlined above since it is capable of very rapid response as its turn-on time depends only on the switching time of the transistors 42 and 46, which is extremely short, while the repetition rate obtainable and the magnitude and duration of the pulse current are determined by the design of the components so that any necessary values can be readily obtained.

The On pulse generator 29 is generally the same as the pulse generator 28 and the corresponding elements are designated by primed reference numerals in FIG. 4. In the pulse generator 29, however, the collector of transistor 42' is connected to the base of transistor 46' through a capacitor 60. In the case of pulse generator 29 the transistor 42' is normally conductive and is turned off to produce an output pulse. With transistor 42' turned on, the capacitor 60 is connected to ground and transistor 46' has no base drive so that it is normally non-conductive and capacitor 48' is not charged. When the voltage on conductor 40 goes negative to trigger the pulse generator 29, transistor 42' is turned off and a charging current flows through capacitor 60 and the base-emitter junction of transistor 46' which momentarily turns on transistor 46', permitting capacitor 48' to charge from the direct current source through transistor 55' and conductor 49'. As soon as capacitor 60 is charged the charging current ceases and transistor 46' turns off. The charge now present on capacitor 48' is then applied to the breakdown diode 50' additively with the voltage of source 44 and an output pulse is produced in the same manner as described above in connection with the pulse generator 28.

The output pulse produced by the On pulse generator 29 is applied through conductors 25 and 26 to the gate electrodes of thyristors 4 and 7 of the chopper 1 in FIG. 3 to turn the chopper on in the manner previously described. The output pulse produced by the Off pulse generator 28 appears on conductor 27 which is connected to the gate electrode of thyristor 6 to turn the chopper off. Thus the pulse generators function when actuated by triggering signals from the control circuit 30 to provide the necessary gating pulses to turn the chopper 1 on or off as required to maintain the motor current at the desired average value in the manner described above. It will be understood that the leads 25, 26 and 27 may be connected to the thyristors through isolating transformers if desired.

To summarize the operation of the complete system, the control signal on the conductor 31 is utilized to obtain a control voltage which is modified by the jerk limit and load weight circuits 33 and 34 and applied to the control circuit 30. A voltage proportional to the motor current is derived from the transductor 20 and also applied to the control circuit 30. If the motor current is less than the desired value, the voltage derived from the transductor will be less than the control voltage and a negative voltage will appear on conductor 40 to trigger the On pulse generator 29 to provide pulses on the conductors 25 and 26 to turn on the chopper 1. When the motor current rises above the desired value by an amount corresponding to the voltage across the impedance element 37, a positive voltage appears on conductor 41 to provide a triggering signal to the Off pulse generator 28 which causes it to provide an output pulse on conductor 27 to turn off the chopper 1. In this way the chopper is turned on and off as required solely in response to the motor current to maintain the current at the desired average value.

In the power connection of the motors, shown in FIG. 1, the action connects the motors to the power source to permit the current to build up and disconnects them from the power source to permit the current to decay through the free wheeling diode 3, so that the average motor current is maintained to give the desired speed or rate of acceleration corresponding to the control signal received on conductor 31. In the braking connection, shown in FIG. 2, resistor 9 is cut in and out of the circuit by the action of the chopper 1 to cause the motor current to rise and fall within the limits corresponding to the voltage across impedance element 37 and to maintain the average braking current at the desired value called for by the control signal.

It will now be apparent that a control system for direct current traction motors has been provided which has many advantages. The control system is entirely static using reliable solid state devices and is relatively simple. The braking and acceleration rates obtainable are infinitely variable and can readily be adjusted by changing the control signal, which permits the complete range of car speed control to be readily obtained and any desired rate of acceleration or deceleration or any specific speed of the car can easily be obtained. The system is simple and requires no resistors for controlling acceleration, thus eliminating the power loss and other undesirable features of such resistors. Furthermore no change in motor connections from series to parallel is required as in conventional systems. The system is particularly well suited for use with automatic train control systems since it requires only a simple control signal in the form of a variable current which can be obtained directly from any type of automatic train control system or which can of course be obtained from a controller of any type on the car. A simple and reliable control system is therefore provided which requires little maintenance but has high reliability and long life and also provides improved performance of a type that cannot readily be obtained with conventional traction motor control systems.

A preferred embodiment of the invention has been shown and described for the purpose of illustration but it will be understood that the invention is not limited to the specific arrangement or circuit details shown but includes all equivalent embodiments and modifications.

I claim as my invention:

1. A control system for a direct current motor comprising semiconductor switching means connected between said motor and a power source, means for providing a control voltage representative of a desired motor current, means for deriving a voltage signal proportional to the actual motor current, first and second series-connected impedance means, said voltage signal being applied across said first and second impedance means, the first impedance means having a substantially constant voltage drop thereacross, third impedance means connected in series with said second impedance means, said control voltage being applied across the third impedance means with its polarity opposing the polarity of the voltage signal, means for actuating said switching means to become conductive when the voltage across the two first-mentioned impedance means is less than the voltage across the third impedance means, and means for actuating the switching means to become non-conductive when the voltage across said second impedance means exceeds the voltage across the third impedance means.

2. A control system as defined in claim 1 in which said first impedance means is a semiconductor device having a substantially constant voltage drop across it.

3. A control system for a direct current traction motor comprising semiconductor switching means connected to control the motor current, a first pulse generator connected to supply pulses to said switching means to actuate the switching means to become conductive, a second pulse generator connected to supply pulses to said switching means to actuate the switching means to become non-conductive, means for providing a control voltage representative of a desired motor current, means for deriving a signal voltage proportional to the actual motor current, first, second and third impedance means connected in series, means for applying said signal voltage proportional to actual motor current across the first and second impedance means, said first impedance means having a substantially constant voltage drop thereacross, means for applying said control voltage across the third impedance means with its polarity opposing the polarity of the signal voltage, means for providing a triggering signal to the first pulse generator when the voltage across the first and second impedance means falls below the voltage across the third impedance means, and means for providing a triggering signal to the second pulse generator when the voltage across the second impedance means rises above the voltage across the third impedance means.

4. A control system for a direct current traction motor comprising semiconductor switching means connected to control the motor current, a first pulse generator connected to supply pulses to said switching means to actuate the switching means to become conductive, a second pulse generator connected to supply pulses to said switching means to actuate the switching means to become non-conductive, means for providing a control voltage representative of a desired motor current, means for deriving a signal voltage proportional to the actual motor current, and means for providing a signal to trigger said first pulse generator when said signal voltage is less than the control voltage and for providing a signal to trigger said second pulse generator when the signal voltage exceeds the control voltage, each of said pulse generators comprising a first capacitor adapted to be charged from a supply voltage, a voltage-responsive semiconductor device, triggering means operative to cause the voltage of said first capacitor to be applied additively with the supply voltage to said semiconductor device to cause the semiconductor device to become conductive, a second capacitor connected to discharge through the semiconductor device to provide an output pulse, and means operative during the occurrence of an output pulse for temporarily disconnecting said capacitors from the supply voltage and for thereafter reconnecting the capacitors to the supply voltage to be charged thereby.

5. A control system as defined in claim 4 in which the means for providing triggering signals to the pulse generators includes first, second and third impedance means connected in series, means for applying said voltage signal proportional to the motor current across the first and second impedance means, means for applying said control voltage across the third impedance means with the polarities of the signal voltage and the control voltage opposing, means for actuating the triggering means of the first pulse generator when the voltage across said first and second impedance means falls below the voltage across the third impedance means, and means for actuating the triggering means of the second pulse generator when the voltage across the second impedance means exceeds the voltage across the third impedance means.

6. A control system for a direct current traction motor comprising semiconductor switching means, means for connecting said motor in a power circuit with said switching means connected between the motor and a power source, means for connecting the motor in a dynamic braking circuit including a braking resistor with said switching means connected across at least a part of said braking resistor, a first pulse generator connected to supply pulses to said switching means to actuate the switching means to become conductive, a second pulse generator connected to supply pulses to the switching means to actuate the switching means to become non-conductive, and means for actuating said first pulse generator to supply a pulse when the motor current is less than a desired value and for actuating said second pulse generator to supply a pulse when the motor current exceeds a desired value, said means for actuating the pulse generators comprising first, second and third impedance elements connected in series, means for applying across the first and second impedance elements a signal voltage representing the actual motor current in either the power connection or the braking connection, means for applying across the third impedance a control voltage representative of a desired motor current, said signal and control voltages having their polarities in opposition, means for supplying an actuating signal to the first pulse generator when the voltage across the first and second impedance elements falls below the voltage across the third impedance element, and means for supplying an actuating signal to the second pulse generator when the voltage across the second impedance element exceeds the voltage across the third impedance element.

7. A control system as defined in claim 6 in which said first impedance element is a semiconductor device having a substantially constant voltage drop across it.

8. A control system as defined in claim 6 wherein said first impedance element is characterized by a substantially constant voltage drop thereacross.

References Cited
UNITED STATES PATENTS

| | | | |
|---|---|---|---|
| 2,515,612 | 7/1950 | Rathbun | 318—380 |
| 3,344,332 | 9/1967 | Polries | 318—332 |
| 2,806,194 | 9/1957 | Lewis | 318—95 |
| 3,375,425 | 3/1968 | Bell | 318—310 |
| 3,389,318 | 6/1968 | Hoyt | 318—345 |
| 3,441,827 | 4/1969 | Payne | 318—341 |

ORIS L. RADER, Primary Examiner

A. G. COLLINS, Assistant Examiner

U.S. Cl. X.R.

318—332, 380, 395